United States Patent [19]

Mattis et al.

[11] Patent Number: 4,799,256

[45] Date of Patent: Jan. 17, 1989

[54] TELECOMMUNICATION SIGNALLING ARRANGEMENT

[75] Inventors: Renate Mattis; Günther Seidel, both of Munich; Heinrich Übelhack, Oberhaching; Russel D. Homer, Munich, all of Fed. Rep. of Germany

[73] Assignee: Siemens Aktiengesellschaft, Berlin and Munich, Fed. Rep. of Germany

[21] Appl. No.: 826,691

[22] Filed: Feb. 6, 1986

[30] Foreign Application Priority Data

Mar. 28, 1985 [DE] Fed. Rep. of Germany ....... 3511324

[51] Int. Cl.$^4$ ...................... H04M 7/06; H04Q 3/545
[52] U.S. Cl. .................................. 379/269; 379/230; 379/284
[58] Field of Search ............................ 364/200, 900; 370/42-43, 94 U, 110.1, 79; 371/72; 375/121; 379/93-94, 97-98, 229-234, 236-237, 239-240, 269, 284

[56] References Cited

U.S. PATENT DOCUMENTS

| 4,574,284 | 3/1986 | Feldman et al. | 340/825.52 |
| 4,707,832 | 11/1987 | Glenn et al. | 370/124 |

FOREIGN PATENT DOCUMENTS 3311043 9/1984 Fed. Rep. of Germany ...... 375/121

OTHER PUBLICATIONS

Telcom Report, vol. 4 (1981), Special Issue, "EWSD Digital Switching System", pp. 7-12 and 22-29.

Primary Examiner—Thomas W. Brown
Attorney, Agent, or Firm—Adel A. Ahmed

[57] ABSTRACT

A circuit arrangement for telecommunication installations, in particular, telephone exchange installations is disclosed in which type information is sent ahead of each communication to be transmitted. In bidirectional communication transmission with different possible communication types, type information announcing the respective communication type is sent ahead. In the receiving equipment the beginning of the arrival of type information is recognized and immediately, that is, almost simultaneously, an assortment of type-specific message corresponding to each of the possible communication types is transmitted in the opposite direction, of which each indicates the readiness or non-readiness for receiving a communication of the respective type. From this and from the transmitted type information it is recognized following the transmission of type information and messages on both sides independently of each other but concordantly whether a communication transmission will subsequently occur, cannot occur or will be postponed to a later time.

11 Claims, 1 Drawing Sheet

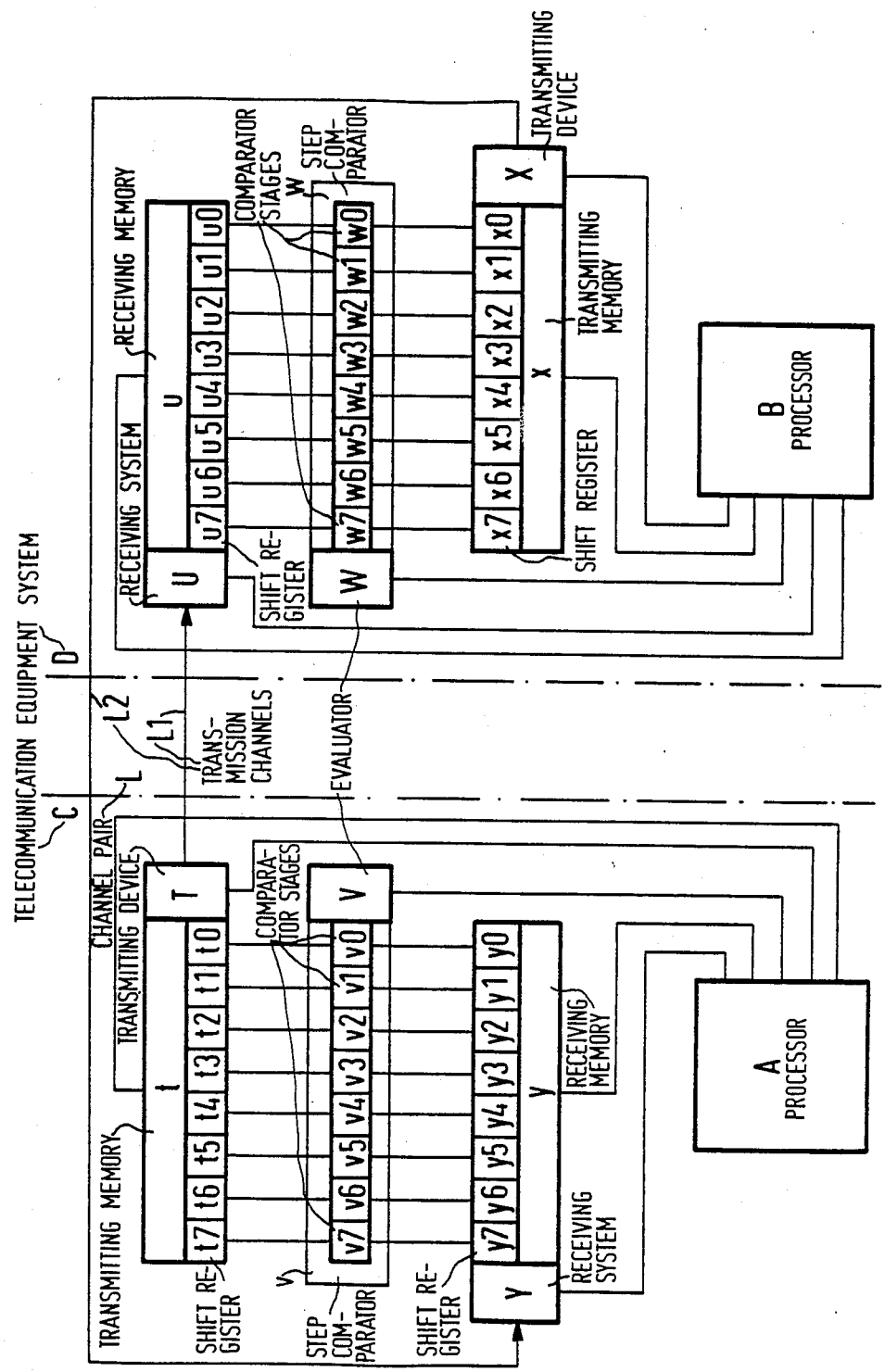

TELECOMMUNICATION SIGNALLING ARRANGEMENT

BACKGROUND OF THE INVENTION

1. Technical Field

This invention relates to the field of stored program control telecommunication installations and, in particular, to telephone exchange installations in which an indication of the type of information is sent ahead in advance of each communication to be transmitted.

2. Description of the Prior Art

The invention relates to a circuit arrangement for telecommunication installations, in particular, telephone exchange installations, in which there is sent ahead of each of a plurality of different communications to be transmitted, a corresponding data block indicating the type of information or about the actually existing type of communications. Depending on the possibly continuously varying operating situation of two such telecommunication exchanges or switching systems adapted for the sending and/or receiving of communications and preferably at least partially also for the processing thereof, one is either ready or not ready to receive a message to be emitted from the other depending on the currently existing operating situation and depending on the announced message type. Thus, before a communication transmission, a message concerning the readiness or non-readiness is transmitted in the opposite direction to the type information for signaling the release or suppression of this transmission. Consequently, the communications, information and messages are transmitted in bit portions having a uniform word format.

A circuit arrangement of this kind is already known through German OS No. 33 11 043. Therein, for the preparation of the transmission of a longer communication, first type information is transmitted by which it is announced of what type a communication queued up for transmission is. Since receiving equipments may either be ready or not ready for reception of a communication of a certain communication type depending on the currently existing operating status, by the exchange of type information and a message preceding the communication transmission, it is determined whether or not the intended transmission can take place immediately or must be postponed to a later time.

Systems of this known kind which operate in the stated manner involve the problem of requiring a predetermined time for the exchange of type information and a message in addition to the actual telecommunication. To this problem must be added the requirement for a second predetermined period in the equipment to receive the respective communication and evaluate the respective type information, that is, for the recognition of the respective type of communication as well as for a calling down of the type-specific message corresponding to this type of communication, which must then be made to go out counter to the type information.

It is the object of the invention then in a circuit arrangement of the initially stated kind, to reduce the time requirements for the preparation of a telecommunication transmittal.

SUMMARY OF THE INVENTION

The present invention solves the problems of the prior art that, simultaneously with the type information going in the opposite direction, that is, from one telecommunication exchange to the other, an assortment—concerning each of the different communication types—of individual type-specific messages is transmitted, of which each one signals to the other the respective readiness or non-readiness individually concerning each of the various possible communication types. A comparison of the type information with the respective type-specific message in the other telecommunication equipment leads to the release of the communication transmission or to its suppression or respectively to its postponement. Also a comparison of the type information with the respective type-specific message in the one telecommunication exchange takes place. Through the result thereof, a following reception of the respective communication is prepared for or delayed, and, in the latter case, the reception of type information of a next following communication is prepared for.

BRIEF DESCRIPTION OF THE DRAWING

In the drawing an embodiment of the invention is illustrated only showing component parts contributing essentially to its comprehension, but the invention is by no means limited to these depicted components.

DETAILED DESCRIPTION OF THE DRAWING

Two telecommunication equipment systems C and D are connected with one another via a channel pair L, consisting of two transmission channels L1 and L2 for the one and for the other communication transmission direction. The telecommunication equipment systems may be of the centralized or decentralized control types equipped with processors for telephone exchange installations. This may involve, for example, the processor in a concentrator (decentralized) and the processor in a link group (cf. the journal "telcom report", English language version, Supplement 1981, page 7ff. and 19ff. or respectively 22ff.) of a time multiplex telephone exchange installation, or the processor in a concentrator and the processor of a multiple subscriber line circuit.

The channel pair L may be part of a pulse code modulated (PCM) system with two times thirty-two channels, which means that thirty-two channels are available for one transmission direction (L1) and thirty-two channels for the other transmission direction (L2). Of these, one channel pair serves for the transmission of communications intended for signaling. They involve communications of various kinds, for example, busying signals, dial signals, switching-in signals, switching signals for various facilities, triggering signals, fee-counting data, busy signals, end of dial signals, status signals, or clearing signals, also, security-engineering messages, control instructions for routing via matrix switching systems and the like.

The telecommunication equipment systems C and D thus are connected to one another via a channel pair L1/L2, whereby communications, instructions and messages can be transmitted in each of the two directions, also independently of each other. This transmission occurs in bit portions of uniform word format, for example, in known manner in the form of PCM words of eight bits each. To this end, each of the two telecommunication equipment systems is equipped with a transmitting device T or X. Each transmitting device is in connection with an eight-step transmitting shift register t0–t7 and x0–x7, respectively, to which a transmitting memory t, x is assigned.

Each of the telecommunication equipment systems has on the receiving side a receiving system U, Y which is connected with a corresponding eight-step receiving shift register u0–u7 and y0–y7, respectively. To each of the two shift registers a receiving memory u, y is assigned. Further, in both telecommunication equipment systems eight step comparators v, w are provided, which serve for bit-wise comparison between the contents in the shift register elements t0–t7 on the one hand and y0–y7, on the other hand, of a transmitting shift register and of a receiving shift register. The comparison results are evaluated by evaluators V, W in each of the two telecommunication equipment systems.

The communications to be relayed are at first in the processors A, B and get to these processors B, A respectively by the transmission. These communications would at first be delivered, offered or made available to these processors for transmission. Appropriate further switching devices may be associated with these processors in a manner known in itself, that is, switching devices which represent data sources or data sinks, respectively.

The communications to be relayed are classified as communications of up to six different types. Various examples of such types of communication have been named already. As the communications are to be stored, temporarily stored or to be processed wholly or partly in the receiving telecommunication equipment system or to be forwarded by it to a data sink, and as there may be limitations for this depending on existing and possibly continuously varying operating situations, a telecommunication equipment system which is to receive a communication is or is not ready for reception, depending on the currently existing operating situation and also according to the existing type of communication queued up for transmission. Thus it may happen, for example, that a memory area which serves to receive dial signals is already full, so that additional dial signals can be accommodated only at a later time. Or it may be that due to work overload a processor can accept no further connection requests, which means in practice that at that time it is not able to receive a busying signal.

For cases of the above stated kind given by way of examples, it is provided that there is sent ahead of each of a plurality of communications to be transmitted a corresponding type information about the communication type queued up for transmission, via the respective communication channel.

As has been stated before, communications of the various types are queued up in each of the two processors or in respective devices correlated to them for the purpose of transmission to the respective other telecommunication equipment system. A processor, for example processor A, forms a type information per communication corresponding to its type and delivers the data to the transmitting memory, for example t, in the form of 8-bit parallel data. With the data, the transmitting memory loads the shift register via eight parallel inputs of its shfit register elements t0–t7. Thereafter the transmitting equipment T causes the eight bits of type information to go out via channel L1. They are received by means of the receiving equipment U and supplied to the shift register u7–u0.

In order that the telecommunication equipment system which has a communication to deliver to the other can recognize whether or not the latter is ready to receive it at the time, the latter system sends, before transmission of the communication, a message concerning the readiness or non-readiness to the first-mentioned system in an opposite direction to the transmittal of type information, for the release or suppression of this telecommunication. In this connection, it is provided that, simultaneously with the type information in the opposite direction, that is, from the telecommunication equipment system which is to receive the respective communication to the other which must deliver this communication, an assortment—concerning each of the various possible communication types—of individual type-specific messages is transmitted, each of which signals to the first-mentioned telecommunication equipment system the respective readiness or non-readiness separately with regard to each of the various possible communication types. In this connection, let it be assumed that a total of six different communication types are provided and that the first bit of a PCM word for transmission of type information may always have the value 1; then the second to seventh bits serve to relay the six different possible type data. Hence each bit has a predetermined type information assigned to it. The last bit then signals the end of the PCM word and again may have the value 1.

As soon as the transmission of type information is set, this fact is recognized in the telecommunication equipment system which is to receive a communication, for example with the aid of the receiving equipment U. A corresponding message is forwarded to the respective processor, for example B. Depending on the currently existing operating situation, whereby this telecommunication equipment system D would be ready to receive communications of some types but not communications of other types, it holds a type-specific message in readiness for each communication type. This holding in readiness can take place by storage in the transmitting memory or in the shift register x0–x7, as long as this memory or register is not needed for the regular transmission of a communication. When, therefore, processor B recognizes that type information is coming in via the receiving device U, that is, when it recognizes the beginning of the arrival of this type information, it causes immediate emission of the assortment of individual type-specific messages via the other of the two channels.

After this transfer of type information from telecommunication equipment system C and assortment of type-specific messages from telecommunication equipment system D (to the respective other system), these type data and messages may moreover be stored in the sending telecommunication equipment system namely in the respective transmitting shift register. That is, no erasure of the transmitted signals takes place during the two transmitting processes. Consequently, after the simultaneous or almost simultaneous transfer of type information and the assortment of type-specific messages, both are in storage in both telecommunication equipment systems in their respective shift registers. In both telecommunication equipment systems there occurs then a comparison of the type information with the type-specific messages. From both comparisons it is evident whether or not the intended telecommunication can take place. A comparison of the type information with the type-specific message corresponding to it thus leads to the release of the telecommunication or to its suppression or postponement, in the telecommunication equipment system which has a communication to send out. A comparison of the type information with the respective type-specific message in the telecommunication equipment system which is to receive the respective communication here has the result that by the outcome of the comparison a subsequent reception of the respective communication is either prepared for or skipped, and that in the latter case the reception of type information of a next following communication is prepared for.

According to the present invention the beginning of reception of type information sent from telecommunication equipment system C, when it arrives at telecommunication equipment system D, initiates the sending out of the assortment of type-specific messages. This beginning of reception of type information arriving in telecommunication equipment system D is recognized by means of receiving device U and is signaled to processor B. The latter immediately causes the sending out of the assortment of type-specific messages held in readiness in the transmitting memory X or in the shift register X0-x7. This transmittal is brought about by means of the sending device X.

As distinguished therefrom, another possibility in the present invention is that the beginning of the sending of type information on the one hand and of the assortment of type-specific messages, on the other hand, is brought about by a common third device, for example a common control device. This can be accomplished for example in that from a common control device a command is given to one of the telecommunication equipment systems, and that, on the one hand, said first system transmits through an activation of another system an interrogating stimulus to it for each activation address, whereupon the latter system causes type information to be sent out in the stated manner, but, on the other hand, the later system already initiates the sending out of the assortment of type-specific messages simultaneously with the receipt of information from the first system.

In the preceding description, it had been assumed that a telecommunication equipment system has only one communication to relay. And accordingly it delivers only one information type. Instead of this one information type, an assortment of type-specific messages is transmitted. Each communication type has assigned to it a certain area within the PCM word consisting of eight bits in all. When a communication type is marked by type information, the respective bit within the particular PCM word would have the binary value 1, whereas otherwise it has the binary value 0. The same applies to the assortment of type-specific messages which are relayed counter to type information.

When relay of type information and of the assortment of type-specific messages has taken place, there are opposite each other individually in the sending shift register, for example t0-t7, and in the receiving shift register, for example y0-y7, type information and type-specific messages according to the various possible communication types. With the aid of the comparators v and w, it is thus possible in a simple manner to compare type information with the type-specific message corresponding to it as to type. With the aid of the evaluators V and W it is established concerning which type information a type-specific message corresponding to it as to type is present. This is true for both telecommunication equipment systems, namely the one which is to deliver a communication as well as the one which is to receive this communication.

Furthermore it is possible to transmit simultaneously several type information data bits which relate to several communications of different types simultaneously, queued up for transmission from a telecommunication equipment system. This presupposes, therefore, that in one telecommunication equipment system several communications of different types are present simultaneously which are to be transmitted to the respective other system. In this connection it is further provided that in the one as well as in the other telecommunication equipment system the previously described comparison occurs in corresponding multiple form. In this connection reference has already been made to the comparator v or w, which is likewise multi-step in accordance with the multi-step shift registers, and which permits a comparison bit-wise per PCM word. In this connection it has furthermore been provided that in both telecommunication equipment systems a priority sequence concerning all communication types is stored. This results from the fact that the shift register elements are arranged in a fixed sequence, and that also the individual comparator stages v0-v7, w0-w7 are arranged in a fixed sequence as well, from which said priority sequence derives. According to this priority sequence regarding all possible communication types stored in both telecommunication equipment systems after transmission of a plurality of type information data bits in a PCM word, and after transmission of a corresponding assortment of type-specific messages, there is established in both telecommunication equipment systems by means of the evaluators V and W that communication type which must subsequently be transmitted according to the existing type information data bits according to the existing type-specific messages, according to the comparisons made therefrom, and according to the said priority sequence. Of the several communications of different types queued up for transmission, therefore, only one communication of one type is selected and transmitted, and then the cycle starts anew by transmission of the type information data of the remaining communications queued up for transmission, and of the respective type-specific messages.

Another possibility without departing from the spirit of the present invention is that from each of the two telecommunication equipment systems one type information and one assortment of messages is sent to the respective other system, and that in each of the two telecommunication equipment systems one of the received type-specific messages is selected accordingly with reference to the transmitted type information. Thus two selected type-specific messages are obtained. In this connection, it is further provided that for the communication types sendable from each of the two telecommunication equipment systems priority values are stored in both systems, and that one of the two selected messages is determined on the basis of these priority values. Then the transmission of the communication occurs according to this message.

The remaining description now addresses those technical features in the embodiment of the circuit arrangement explained in abridged form which relate to the volume of individual communications to be transmitted. Already in known circuit arrangements, on connection with communications to be transmitted via biodirectional paths, of one of a plurality of different types, a length indication is formed and transmitted before the telecommunication. This is the case also with the present embodiment. Here also type information identifying the respective communication type is formed, as was explained in detail before. It is further evident from the previous description that from a telecommunication equipment system which has to deliver a communication to another system type information corresponding to the communication type of this communication is sent ahead. Further it has been explained that practically simultaneous with the transmission of the type information the transmission of the assortment of type-specific messages takes place in the opposite direction.

In contrast to known arrangements, the aforesaid length indication is transmitted in opposite direction to the type information. Nor does the length indication concern the length of the communication queued up for transmission in a system, but rather it indicates in the present case what volume—momentarily given by the possibly continuously varying operating situation—of a communication of the respective type the system which is to receive the respective communication is ready to receive. As has been stated before, the operating situation existing at various times is not always the same. It may vary continuously. This may be due, for example, to the degree of filling of a memory section provided for temporary storage of dial signals. While the previous description focusd on the aspect of whether a communication can be received by the system for which it is intended or whether it can not receive this communication, in the following there is explained the case where the respective system is able to receive a communication of the specified type only up to a certain volume. So there is determined in the manner described in detail above, first, by means of type information and type-specific messages whether transmission of the particular communication type is possible at all at that particular moment. If it is found to be possible in principle, the system which is to receive the communication transmits counter to the type information a length indication, by which it is signaled what length, e.g. what number of PCM words, a communication queued up for transmission may have as a maximum. In contrast to known arrangements, the type information is transmitted first and then the length indication. The length indication is transmitted following the assortment of type-specific messages in a second PCM word.

The length indication, transmitted counter to the type information after the assortment of type-specific messages, is received by means of the respective receiving system, for example, in receiver Y, and is transferred via the receiving shift register, for example y0-y7, to the receiving memory y, whence it is transferred to the processor, for example A, of the telecommunication equipment system, for example C, from which the intended communication transmission is to take place. The respective processor, for example A, now compares the received length indication with the length of the communication to be relayed. In accordance with the comparison result obtained, the intended communication transmission then either takes place or not, or respectively this transmission is postponed to a later time, at which point all processes required for this are restarted in the manner already described.

To recapitulate, the type information is sent ahead of the communication, first the type information and thereafter the length indication is transmitted, the type information being transmitted in the direction of the communication, the length indication in the opposite direction. In contrast to known arrangements, the type information is not derived on the receiving side from an address transmitted with the communication; instead it is formed on the transmitting side and sent ahead of the communication to be transmitted. The length indication relates to the communication type signaled by the type information and indicates for it the volume which a communication to be transmitted may have as a maximum. If the capacity of the receiving telecommunication equipment system for communications of the signaled type is limited by the current operating situation, the returned length indication provides for the prevention of the respective communication transmission or for its postponement, thereby avoiding mutilation of communications or bottlenecks in receiving, and provides that the respective communication transmission can take place after an operating situation suitable therefor has returned.

What is claimed is:

1. A circuit arrangement for telecommunication installations, in particular telephone exchange installations wherein there is sent ahead of each of a plurality of different communications to be transmitted corresponding type information about the type of communication actually existing, and wherein, depending on the possibly continuously varying operating situation of two telecommunication equipment systems adapted for the sending and/or receiving of communications and at least partially also for the processing thereof, one system is either ready or not ready to receive a communication to be emitted from the other system depending on the currently existing operating situation and depending on the announced type of communication, and wherein before a communication transmission a message concerning the readiness or non-readiness is transmitted in an opposite direction to the direction of transmittal of type information for the release or suppression of said communication transmission, and where, in said circuit arrangement message communications, information and messages are transmitted in bit portions of a uniform word format, characterized in that, simultaneously with type information going in the opposite direction, that is, from one telecommunication equipment system to the other system, an assortment of individual type-specific messages is transmitted concerning each of the different communication types of which each system signals to said other system the respective readiness or non-readiness individually, concerning each of the various possible communication types, and that a comparison of the type information with the respective type-specific messages in the other telecommunication equipment system leads to the release of the communication transmission or to the suppression thereof or respectively to a postponement, and that also a comparison of the type information with the respective type-specific message in the one telecommunication equipment system takes place, and that through the result thereof a next following reception of a respective communication is prepared for or skipped, and that in the latter case the reception of type information of a next following communication is prepared for.

2. A circuit arrangement according to claim 1, further characterized in that the beginning of the type information emitted by the said other telecommunication equipment system initiates, when it arrives in said one telecommunication equipment system, the emission in the one system of the assortment of type-specific messages.

3. A circuit arrangement according to claim 1 further characterized in that several type information data bits relating to several communications of different types, queued up simultaneously for transmission, are transmitted simultaneously, and that in one as well as the other telecommunication equipment system the comparison takes place several times accordingly, and that based on a priority sequence stored in both telecommunication equipment systems relating to all communication types, a communication is determined of a type of communication where said type of communication is accordingly to be transmitted thereafter.

4. A circuit arrangement according to claim 1 further characterized in that the beginning of the sending of type information on the one hand and of the assortment of type-specific messages, on the other hand, is brought about by a common further arrangement.

5. A circuit arrangement according to claim 1 further characterized in that, from each of the two telecommunication equipment systems, one type information each and one assortment each of type-specific messages is sent to the respective other telecommunication equipment system, that in each of the two telecommunication equipment systems one of the received messages is selected based on the respective emitted type information, that for the communication types sendable from each of the two telecommunication equipment systems, priority values are stored in both telecommunication equipment systems, and that if two selected messages are obtained, one is selected on the basis of these priority values.

6. A circuit arrangement according to claim 4 wherein said common further arrangement comprises common control equipment.

7. A circuit arrangement for telecommunication installations, in particular telephone exchange installations wherein there is sent ahead of each communication of a plurality of different communications to be transmitted corresponding type information relating to said communication and wherein, depending on the possibly continuously varying operating situation of two telecommunication equipment systems adapted for the sending and/or receiving of communications and at least partially also for the processing thereof, one system is either ready or not ready to receive communication to be emitted from the other system depending on a prevailing operating situation and depending on an announced type of communication, and wherein before a communication transmission a message concerning the readiness or non-readiness is transmitted in an opposite direction to the direction of transmittal of type information for the release or suppression of said communications transmission, and where in said circuit arrangement, message communications, information and messages are transmitted in bit portions of uniform word format, characterized in that, simultaneously with type information going in the opposite direction, that is, from one telecommunication equipment system to the other system, an assortment of individual type-specific messages is transmitted concerning each of different communication types of which each system signals to said other system a respective readiness or non-readiness individually, concerning each of various possible communication types, and that a comparison by said circuit arrangement of the type information with the respective type-specific message in the other telecommunication equipment system leads to the release of the communication transmission or to the suppression thereof or respectively to a postponement, and that also a comparison by said circuit arrangement of the type information with the respective type-specific message in the one telecommunication equipment system takes place, and that through the result thereof a next following reception of a respective communication is prepared for or skipped, and that in the latter case the reception of type information of a next following communication is prepared for.

8. A circuit arrangement according to claim 7, further characterized in that the beginning of the type information emitted by the said other telecommunication equipment system initiates, when it arrives in said one telecommunication equipment system, the emission in the one system of the assortment of type-specific messages.

9. A circuit arrangement according to claim 8 wherein said circuit arrangement includes means for transmitting several type information data bits relating to several communications of different types, queued up simultaneously for transmission, and that in one as well as the other telecommunication equipment system the comparison takes place several times accordingly, and that based on a priority sequence stored in both telecommunication equipment systems relating to all communication types, a communication is determined accordingly of a type to be transmitted thereafter.

10. A circuit arrangement according to claim 9 further characterized in that the beginning of the sending of type information on the one hand and of the assortment of type-specific messages, on the other hand, is brought about by a common further arrangement.

11. A circuit arrangement according to claim 10 wherein said common further arrangement comprises common control equipment.

* * * * *